United States Patent [19]

Urlik

[11] Patent Number: 4,625,930
[45] Date of Patent: Dec. 2, 1986

[54] FILM WINDING AND REWINDING APPARATUS

[75] Inventor: Randall G. Urlik, Englewood, Colo.

[73] Assignee: Goldberg Brothers, Inc., Denver, Colo.

[21] Appl. No.: 666,187

[22] Filed: Oct. 29, 1984

[51] Int. Cl.$^4$ .......................................... B65H 18/10
[52] U.S. Cl. ............................ 242/67.3 R; 242/67.4; 242/202; 242/204; 242/205
[58] Field of Search ............... 242/67.3 R, 67.4, 202, 242/204, 205, 200, 190, 57, 207; 352/168, 173; 360/90, 96.3, 96.4

[56] References Cited

U.S. PATENT DOCUMENTS

| | | | |
|---|---|---|---|
| 2,685,950 | 8/1954 | Demby | 242/57 |
| 2,782,677 | 2/1957 | Steigman | 242/57 X |
| 3,235,197 | 2/1966 | Johnson et al. | 242/67.4 X |
| 3,494,573 | 2/1970 | Gerlach | 242/202 |
| 3,528,628 | 9/1970 | Wangerin | 242/67.4 X |
| 3,677,498 | 7/1972 | Johnson et al. | 352/168 X |
| 3,779,485 | 12/1973 | Wolf et al. | 242/67.4 X |
| 3,806,061 | 4/1974 | Kollar et al. | 242/202 |
| 3,809,336 | 5/1974 | Kollar et al. | 242/204 X |
| 3,858,828 | 1/1975 | Bundschuh et al. | 242/207 |
| 3,977,620 | 8/1976 | Devel | 242/67.4 |

*Primary Examiner*—John M. Jillions
*Attorney, Agent, or Firm*—Edwin L. Spangler, Jr.

[57] ABSTRACT

This invention relates to a film winding and rewinding machine characterized by a single unidirectional motor being used in cooperation with a pair of electrically-actuated clutch/brake units and a suitable power train to actuate the take-up reel in either direction. It also encompasses an automatic mechanism responsive to the tail end of the film leaving the hub of the supply reel to shut off power to the motor and stop the take-up reel in both the FORWARD and REVERSE modes. It further envisions using the drag of the friction brake in whichever of the clutch/brake units is actuated into its clutch mode to apply a variable tension to the film coming off of the reel functioning in the capacity of the supply reel.

14 Claims, 6 Drawing Figures

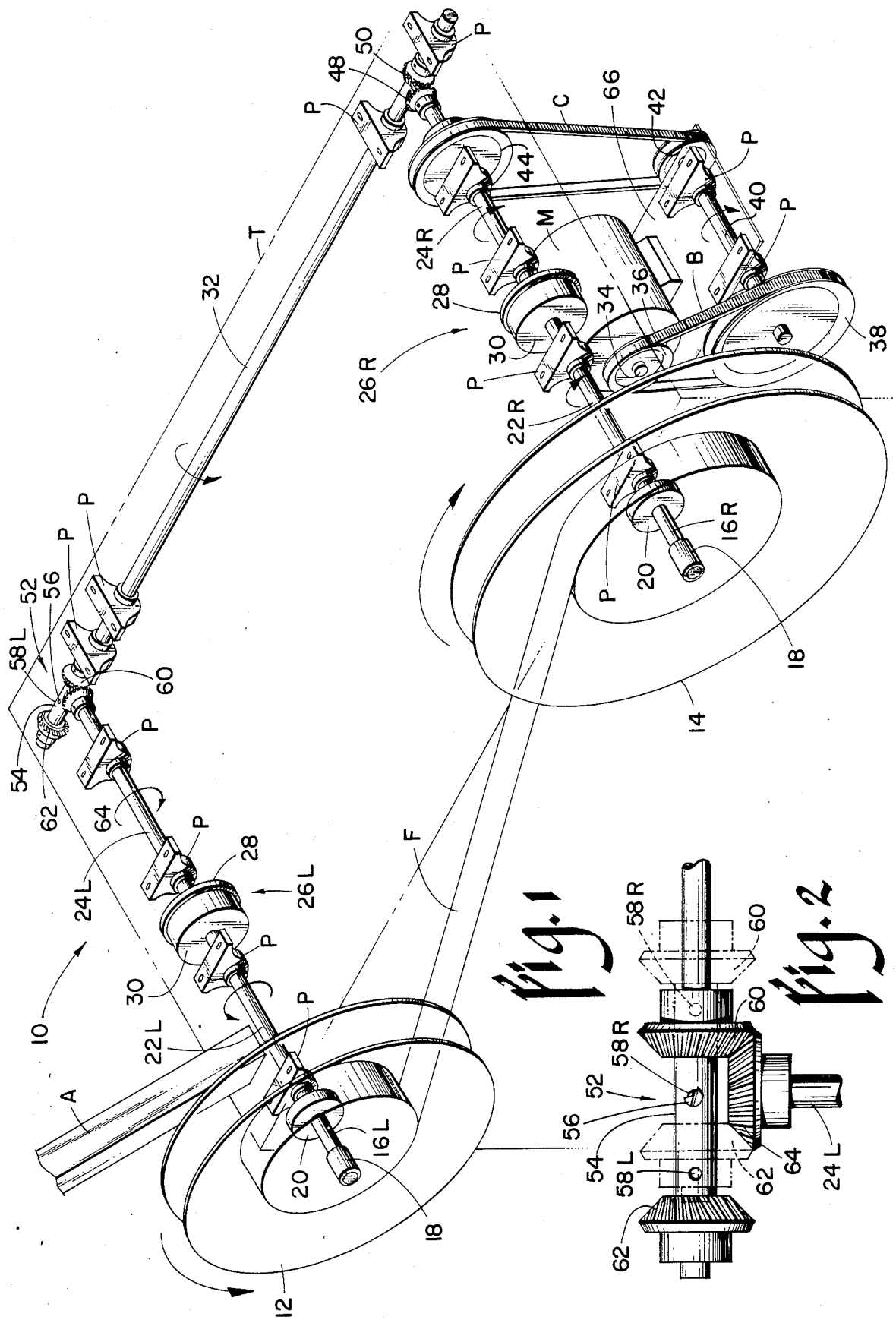

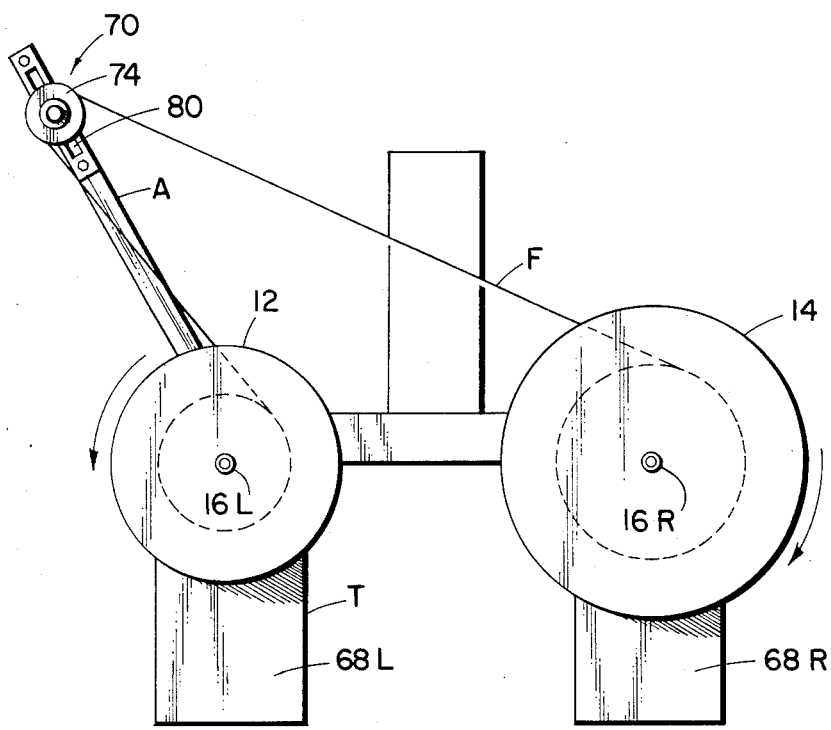
Fig. 4
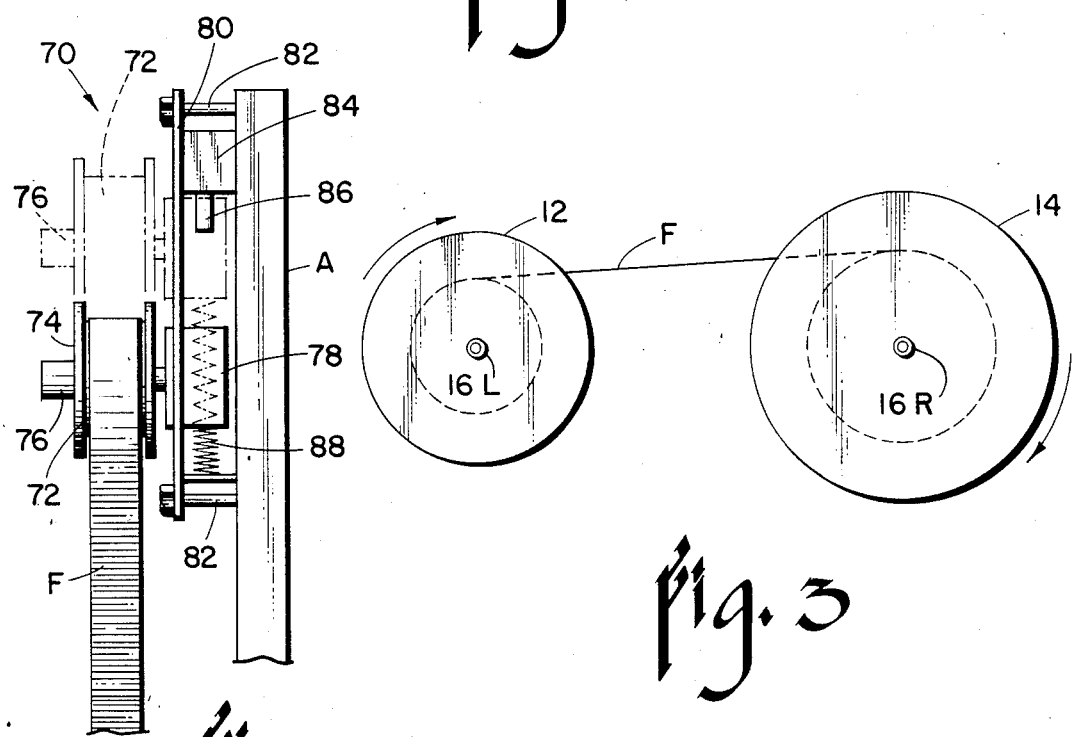
Fig. 5
Fig. 3

FILM WINDING AND REWINDING APPARATUS

The existing motorized film winding and rewinding machines of which applicant is currently aware all use a unidirectional electric motor powering the take-up reel with some sort of friction brake engaging the supply reel spindle to retard its rotation and thus prevent it from overrunning while, at the same time, keeping the film under tension. As such, there is no provision made for reversing the roles of the reels, i.e. making the take-up reel the supply reel and vice versa by running the film from the former to the latter in the opposite direction. This operation, which is a commonplace one, is currently performed by manually switching the reels since only one is driven while the other is braked frictionally.

The tensioning of the film using a friction brake is also not without its problems since, while it is possible to change the drag on the supply reel with most of the prior art winding machines, to do so requires at least the use of a wrench and a certain amount of time to get the right adjustment. Also, as the brake shoes wear, they must be readjusted from time-to-time and eventually replaced.

A working day spent switching reels around, especially 70 mm reels full of film, is not all that easy and, for this and other reasons, a reversible motorized system would be in much demand. Quite obviously, a pair of reversible electric motors, one on each of the two spindles, would do the job if it were not for the fact that such a set up would be prohibitively expensive and hardly justified since, in addition to the motors, one would need appropriate disconnect mechanisms and the usual braking devices required to keep the reels from overrunning. Perhaps even a single reversible motor would suffice provided one could figure out a scheme for alternately connecting it to one spindle and disconnecting it from the other as its direction of rotation is changed. The same situation exists as with two separate motors, namely, the need for all the other auxiliary equipment to tension the film and keep whichever of the two reels as is functioning as the supply reel from overrunning.

Applicant has now discovered in accordance with the teaching of the instant invention that these and other shortcomings of the prior art film winding and rewinding machines can be overcome by the simple, yet unobvious, expedient of using a single unidirectional motor in combination with a pair of dual-action clutch/brakes of conventional design and a suitable drive train to power one of the reels in either direction as well as to tension the film passing therebetween. More specifically, by energizing one of the clutch/brakes such that it locks the input shaft connected into the latter from the motor with the output shaft leaving same for conjoint rotational movement while, at the same time, actuating the other of the clutch/brakes into its clutch mode where frictionally-inhibited relative rotation between its input and output shafts is allowed to take place, the foregoing can be accomplished.

Applicant has also incorporated into his film winding machine a novel shut off system actuated when the film end leaves the supply reel that is automatically operative to cut off power to the motor, the armature of which along with a portion of the drive train then functions as an inertia brake to bring the take-up reel full of film to almost an immediate stop.

It is, therefore, the principal object of the present invention to provide a novel and improved electric motor-driven film winding and rewinding apparatus.

A second objective is the provision of a device of the type aforementioned which used a single unidirectional electric motor as its only drive mechanism, yet is reversible.

Another object is to provide a film winding machine of the type herein disclosed and claimed which tensions the film and allows the operator to maintain a much more nearly constant pull thereon regardless of the amount of film on either the supply or take-up reel by simply varying the voltage supplied to the clutch/brake unit controlling the supply reel by means of a variable resistor.

Still another objective of the within-described invention is that of providing an automatic shut off mechanism responsive to the film end leaving the supply reel which is operative to cut off power to the motor thus using the retardant action developed when the full take-up reel tries to turn the armature of the motor along with portions of the drive train to bring it to a stop.

An additional object is to provide a piece of equipment of the type described which includes a pair of clutch/brake units, either of which can be adjusted instantly by varying the voltage supplied thereto when actuated in the clutch mode and with the film being transferred from one reel to the other, to vary the drag on whichever reel is functioning as the supply reel thereby changing the film tension.

Further objects are to provide a reversible film winding and rewinding mechanism which is safe, reliable, easy to use, relatively inexpensive, versatile in that it can handle virtually any width strip film, compact, rugged and even somewhat decorative.

Other objects will be in part apparent and in part pointed out specifically hereinafter in connection with the description of the drawings that follows and in which:

FIG. 1 is a schematic view in perspective showing the drive train operatively connecting the motor to the supply and take-up reels through the two clutch/brake units;

FIG. 2 is a fragmentary view to an enlarged scale showing a representative type of reversing mechanism that could be used to shift the power train from its so-called "A wind" mode into "B wind" mode;

FIG. 3 is a diagram showing the path of the film from reel-to-reel in the B wind mode;

FIG. 4 is a front elevation showing the path of the film from the supply to the take-up reel as it is threaded over the automatic shut off mechanism;

FIG. 5 is a fragmentary view to a greatly enlarged scale showing the details of the automatic shut off mechanism; and, FIG. 6 is a circuit diagram illustrating the electronic circuit diagram used for controlling operation of the apparatus.

Figure 6:
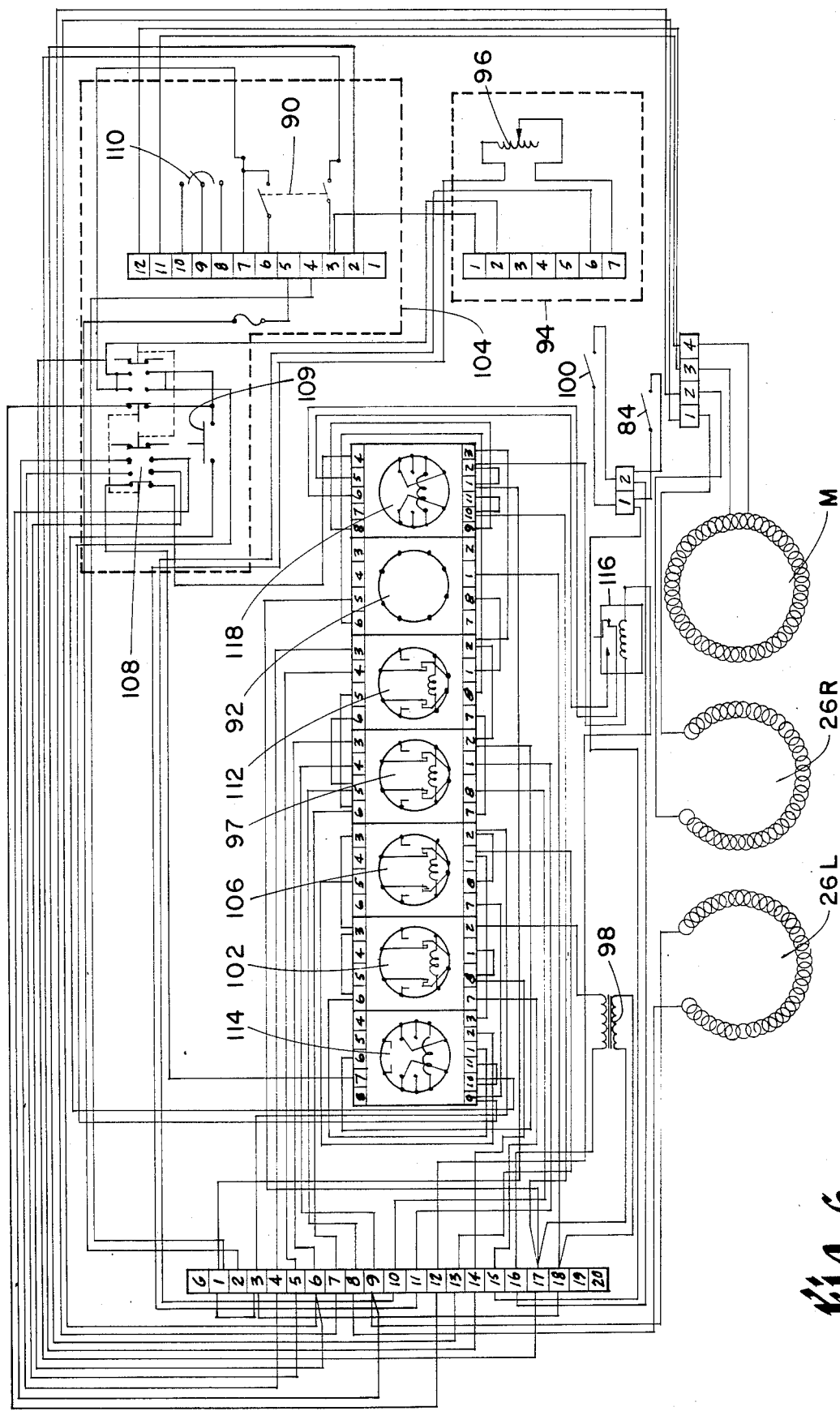

Referring next to the drawings for a detailed description of the present invention and, initially, to FIG. 1 for this purpose, reference numeral 10 has been selected to broadly designate the reel drive mechanism and numerals 12 and 14 the film reels selectively driven thereby. The reel from which the film F wound thereon is taken will be referred to herein as the "supply reel" while the one which receives the film from the supply reel will be denominated the "take-up reel". Either reel 12 on the left in FIG. 1 or reel 14 on the right can function as the supply or take-up reel as will appear presently. Conventional reel drive spindles 16R and 16L are journalled for rotation in spaced substantially parallel relation as shown. Each such spindle detachably connects to the reel hub in the center of the reel for conjoint rotation, no attempt having been made to show the details of this connection which is well known in the art. In the particular form shown, a reel retainer 18 holds the reel on the spindle and a shaft coupling 20 on each of the spindles connects them to their respective output shafts 22L and 22R, respectively, for conjoint coaxial rotation. What will be denominated here as "input shafts" 24L and 24R are coaxially aligned with output shafts 22L and 22R, respectively, but are journalled for rotation independently thereof in pillow blocks P.

An operative connection between aligned shafts 22 and 24 is established frictionally by a pair of clutch/brake units that have been broadly designated by reference numerals 26L and 26R. These units are commercially available in many different sizes and they each include an axially-movable armature 28 which is sometimes spring loaded into a retracted inoperative position and an electromagnet 30 faced with a friction plate. As voltage is supplied to the electromagnet, it responds by attracting the armature overcoming the spring bias on the latter to either lock the two together for conjoint rotation or, alternatively, to permit frictionally-inhibited slippage to take place therebetween depending upon the voltage supplied to the magnet. The particular units shown were obtained from Warner Electric Company. Similar units are, undoubtedly, available from other suppliers. Functionally, each of these units has two actuated conditions, the first being what will be referred to here as the "brake mode" wherein the armature 28 is electromagnetically attracted to the friction disk carried by the magnet 30 such that input shafts 24 are connected to their output shafts 22 for conjoint rotation. The second actuated position is also an operative one in which the electromagnetic attractive forces between the magnet and armature are present but of insufficient magnitude to lock these elements and the shafts joined thereto together for conjoint rotation provided a load is applied to one of the two engaged elements to overcome the frictional contact therebetween. In this second so-called "clutch mode", the magnetic attractive forces between the armature and magnet can be varied by means of a variable resistor such that the input shafts 24 exert a retardant action on the driven shafts 22 which inhibit their being driven in the reverse direction. It is this clutch mode which is employed to tension the film F as it passes from one reel to the other, this being an operation that will be described in greater detail presently.

A transverse shaft 32 has been shown operatively interconnecting the right and left input shafts 24R and 24L for synchronous rotation. Electric motor M is mounted in the particular arrangement shown such that its motor shaft 34 lies in spaced parallel relation to the axially-aligned output and input shaft combinations previously described. A pulley 36 on the motor shaft is connected by means of a V-belt B to a second pulley 38 on the front end of intermediate shaft 40. Pulley 42 on the other or rear end of this intermediate shaft is, in turn, operatively connected to pulley 44 on the rear end of the righthand input shaft 24R by means of V-belt C. Thus from an operator's position facing the reels, if we assume that the motor shaft is turning clockwise, intermediate shaft 40 along with input shaft 24R will be doing likewise.

A pair of meshed bevel gears 48 and 50 on adjacent ends of the righthand input shaft and the transverse shaft 32 cooperate to turn the latter in the opposite direction, i.e. counterclockwise as viewed from the righthand end of the drive assembly. On the opposite or lefthand end of transverse shaft 32 is shown a representative type of reversing subassembly which is of conventional construction and could be used to reverse the direction of rotation of input shaft 24L with respect to the direction of rotation of transverse shaft 32. The aforementioned subassembly has been designated in a general way by reference numeral 52 and it is most clearly revealed in FIG. 2 to which brief reference will now be made.

In FIG. 2 it will be noted that the reversing subassembly comprises an axially moveable sleeve 54 non-rotatably pinned by means of bolt 56 to shaft 32 for axial slideable movement therealong between two operative positions, namely, a first extended one defined by righthand aperture 58R and a second retracted position in which bolt 56 is positioned in lefthand aperture 58L. Bolt 56 is screwed into a single threaded opening (not shown) in the shaft 32 beneath sleeve 54 and one of the two apertures 58 in the latter to maintain the reversing subassembly 52 in either its extended position shown by full lines or its retracted position represented by phantom lines. Fixed non-rotatably on the opposite ends of this sleeve are a pair of bevel gears 60 and 62. The rear end of input shaft 24L mounts a third bevel gear 64 which selectively meshes with one of the opposed bevel gears 60 or 62 depending upon whether the subassembly 52 is in its extended or retracted position. Now, it will be apparent that if transverse shaft 32 is turning counterclockwise and the reversing subassembly 52 is shifted into its full-line extended position shown in FIG. 2 that input shaft 24L will turn in the same direction as its counterpart on the right side, shaft 24R, namely, clockwise. Alternatively, with the reversing subassembly in its phantom line retracted position, input shaft 24L will be rotated counterclockwise.

Returning to FIG. 1, the condition shown is the so-called "A wind" position used in winding and rewinding 35 mm and 70 mm film. In this A wind mode the reversing subassembly is shifted into its extended position so as to rotate both input shafts 24R and 24L clockwise at the same speed. As shown, reel 12 on the lefthand spindle 16L is functioning as the supply reel with the film coming off the bottom thereof and being wound onto the top of the take-up reel 14. With reel 14 functioning as the take-up reel, clutch/brake unit 26R on the righthand side is actuated into its brake mode where input shaft 24R and output shaft 22R turn as a unit. Thus, the motor shaft 34 along with all the aligned shafts 24R, 22R and 16R will all be turning clockwise as will be the lefthand input shaft 24L. Whenever, one of the two clutch/brake units 26R or 26L is actuated into one of its two operative conditions, the other is simultaneously shifted into the second of these operative conditions; therefore, with unit 26R shifted into the brake mode, unit 26L will be in the clutch mode. As take-up reel 14 is being driven clockwise as indicated, the film drawn off the bottom of the supply reel 12 will, of course, cause the latter to turn counterclockwise. Thus, its spindle 16L and the output shaft 22L connected thereto will be turning in the opposite direction to input shaft 24L. The frictional interaction between the brakedisk-faced magnet 30 and the armature 28 of clutch/brake unit 26L will, however, be acting such that it will attempt to turn the output shaft 22L, spindle 16L and reel 12 all clockwise. The brake mode of the righthand clutch/brake unit is much more powerful than the clutch mode of the lefthand unit so that the latter slips but, in so doing, it exerts a substantial retardant action on the supply reel effective to tension the film as it passes onto the the take-up reel 14. This retardant action does not remain constant as the turns of film build up on the take-up reel 14 and are taken off of the supply reel 12; however, it is a simple matter to adjust the film tension periodically by merely actuating the variable resistor 96 contained in the variable power supply 94 supplying power to the lefthand clutch/brake unit 26L switched into the clutch mode that is connected to the supply reel, all of which will be described in greater detail presently in connection with FIG. 6.

As an alternative, reel 14 can function as the supply reel and reel 12 as the take-up reel. To reverse these functions, one need only shift the righthand clutch/brake unit 26R into its clutch mode and the lefthand one 26L into the brake mode. The reversing subassembly is left in its extended full-line position operative to turn input shaft 24L in the same direction, clockwise, as its conunterpart on the right side, shaft 24R assuming either 35 mm or 70 mm film is to be rewound. Now, however, reel 12 will be driven clockwise pulling film from reel 14 which then will be forced to turn counterclockwise. As was formerly the case with clutch/brake unit 26L, unit 26R on the righthand end is now in the clutch mode with input shaft 24R turning in the opposite direction from output shaft 22R thus, once again, bringing to bear the variable manually-controlled retardant action necessary to properly tension the film. Using a simple unidirectional electric motor M, therefore, the power train just described when equipped with a pair of clutch/brake units, can function to wind or rewind film without having to shift the reel onto different spindles.

In the diagram of FIG. 3, to which brief reference will now be made, an alternative wind mode (B wind) has been illustrated which is the industry standard used for 16 mm film. It can, of course, also be employed with 35 mm or 70 mm film that has been improperly wound which occasionally happens. Using the B wind, the film is wound from the top of the supply reel 12 onto the top of the take-up reel 14 rather than from the bottom of the former to the top of the latter as was the case with 35 mm and 70 mm film that uses the A wind set up of FIG. 1. In order to shift from the A wind of FIG. 1 to the B wind of FIG. 3, it is only necessary to remove bolt 56 shown in FIG. 2 from righthand aperture 58R, slide the sleeve 54 along with the bevel gears carried thereby into the retracted phantom line position where the lefthand aperture 58L registers with the threaded opening in shaft 32 and then replace bolt 56. In so doing, the assembly is locked non-rotatably in retracted position with bevel gear 62 meshed with gear 64 on the input shaft 24L while gear 60 is disengaged.

In the B wind mode with the apparatus actuated in the forward direction where reel 12 on the lefthand side remains the supply reel and reel 14 on the righthand side functions as the take-up reel, everything remains the same as in the A wind mode of FIG. 1 except that input shaft 24L on the left is now turning counterclockwise and output shaft 22L is being turned clockwise as the film is now being pulled off the top thereof rather than the bottom. The righthand clutch/brake unit 26R remains in the brake mode while the lefthand one 26L is in the clutch mode. Output shaft 22L continues to counterrotate relative to input shaft 24L; however, they are turning in reverse as compared with the A wind mode. All the directional arrows in FIGS. 1 through 4, inclusive, show the apparatus actuated in the forward direction in which the film is taken off the supply reel 12 on the operator's left and transferred to the take-up reel 14 on his or her right. All but FIG. 3, however, show the A wind set up.

Now, if the apparatus is actuated in the reverse direction to take film off righthand reel 14 and transfer it to lefthand reel 12 in the B wind mode, righthand clutch/brake unit 26R must, as was the case in the A wind mode, be shifted to the clutch mode while its companion unit on the lefthand side is placed in the brake mode. By so doing, reel 12 will assume a counterclockwise rotation the same as input shaft 24L and the output shaft 22L connected to the latter for conjoint rotation. Reel 14, on the other hand, will now be turning counterclockwise while its input shaft 24R turns clockwise and the clutch/brake unit will thus become effective to impart a frictional drag to the supply reel thereby tensioning the film.

In phantom outline in FIG. 1, the top of a table T will be seen, the whole table having been shown in FIG. 4. All of the pillow blocks P shown in FIG. 1 are either fastened to the underside of this table or to motor mounting platform 66 depending from its righthand pedestal 68R. The top of the table T also mounts an arm A which carries the automatic shut off subassembly that has been indicated in a general way by reference numeral 70 and which will now be described in detail in connection with FIGS. 4 and 5.

The section of film F bridging the gap between the reels is wound over the hub 72 of a flanged idler spool 74 which is, in turn, mounted for rotation on a stubshaft 76. This stubshaft parallels the reel spindles 16 and is attached to a slideblock 78 for movement therewith along a rail defined by a bar 80 held in spaced substantially parallel relation to arm A by a pair of mounting bolts 82 located at opposite ends thereof. Slideblock 78 can be seen in FIG. 5 to project into the space between the arm A and the rail 80. In this same space at the upper end thereof is a normally-closed microswitch 84 having its actuator 86 located in the path of the slide block as it slides upwardly along the rail. At the lower end of this space is placed a compression spring 88 having one end seated atop the lower of the two mounting bolts 82 and its upper end in engagement with the underside of the slideblock so as to normally bias the latter upwardly into contact with the switch actuator 86.

The tension on the film normally holds the spool 74 in its retracted full-line position shown in FIG. 5 thus holding the compression spring 88 compressed and leaving switch 84 closed. As the trailing end of the film F leaves supply reel 12, the film is, obviously, no longer under tension and spring 88 will push the slideblock up into engagement with the switch actuator 84 thus opening switch 84. This switch is connected in the circuit with motor M and, therefore, when it is actuated into open position, the motor will stop for lack of power. What has become the fully-loaded take-up reel 14 is now forced to turn the armature of the motor M along with all the elements of the power train leading up to it and to the lefthand clutch/brake unit 26L, it as well as the righthand one remaining actuated even though the motor is shut off. Of course, with clutch/brake unit 26L actuated in the clutch mode and no film left on the supply reel 12, it will try and reverse the direction of rotation of the latter from counterclockwise to clockwise thus reducing somewhat the load on the take-up reel trying to bring it to a stop. Nevertheless, experience has shown that the loaded take-up reel 14 will come to a complete stop in at most a few revolutions using the motor armature and associated drive train as an inertia brake.

Referring to FIG. 6 for a detailed description of the control circuit, the operation of the unit will first be described in the FORWARD mode, A wind. Switch 90 is the main power switch which is a double-pole single-throw one operative in closed position to energize fixed power supply 92 and variable power supply 94. With variable power supply 94 supplied with power its output goes through the normally-closed contacts of relay 97 which actuates clutch/brake unit 26L into the clutch mode. Variable power supply 94 includes a potentiometer represented in the diagram by a variable resistor 96. Transformer 98 is also energized upon actuation of the main power switch to closed position. Microswitch 84 will be open due to the fact that the film is not tensioning the spool and slideblock into retracted position; however, if switch 100 is actuated to closed position shunting microswitch 84, transformer 98 will activate the control power to relay 102. Relay 102 when thus activated will complete a circuit up to time delay relay 106 which relay, however, is without control power at this point, therefore, there is no power input to motor control 104. Power is available at mode or direction control switch 108 which is seen to be a three-position four-pole double-throw switch. It has an OFF position in which it is open and two closed positions, one being FORWARD and the second, REVERSE.

To begin operation, mode switch 108 is actuated from OFF into its FORWARD position which puts control voltage to time delay relay 106 and it commences its time delay period of several seconds at the expiration of which it closes and completes the input power to motor control 104. At this same time, power is supplied to one side of momentary start switch 109, the function and operation of which will be described in detail presently. The output of motor control 104 when thus activated will turn on motor M provided speed adjustment control 110 is on other than zero. When 110 is set on other than zero, the system should be protected against a full power or near full power start-up of motor M. This is accomplished by building in a two-second "ramp time" motor circuit thus allowing motor M to come up to speed slowly. Actuation of mode switch 108 into the FORWARD mode immediately energizes the righthand clutch/brake unit 26R into the brake mode by allowing current flow from the output of fixed power supply 92 through the normally-closed contacts of relay 112. Righthand reel 14 is now being driven clockwise and is functioning as the take-up reel while reel 12 on the left side is the supply reel. Clutch/brake unit 26L on the left side is actuated into the clutch mode and depending upon the setting of variable resistor 96 in the variable power supply 94, it will be exerting a frictional drag on this reel thus tensioning the film. The left input shaft 24L will be turning clockwise while output shaft 22L will be forced to turn counterclockwise due to the film being pulled off supply reel 12.

As soon as the film is tensioned, it can be threaded over spool 74 which will pull the slideblock 78 down against the bias of spring 88 thereby releasing switch 84 to its normally-closed position. As thus actuated, manual switch 100 can be reopened to activate the automatic shut off subassembly 70 which subassembly, by the way, is fully operative in both the FORWARD and REVERSE modes. As the film end leaves supply reel 12, it will release the shut off subassembly 70 in the manner previously described to reopen switch 84. When this switch reopens, control power is cut off to relay 102 thus opening the input circuit to motor 104 and shutting off the motor M.

An alternative start-up mode which avoids the time delay through time delay relay 106 utilizes relay 114. One side of the power circuit required to energize quick-start relay 114 is supplied through the normally-closed contacts of relay 106. Closure of quick-start switch 109 completes the circuit to quick-start relay 114 thus shunting that portion of time delay relay 106 which normally impresses a time delay on the operation of motor control 104.

Momentary actuation of switch 109 also actuates another section of quick-start relay 114 so as to shunt the normally-open contacts of 109 thereby enabling it to be released to open position and keep the motor control circuit energized. Even though a section of time delay relay 106 has been shunted, it is still timing and when it times out, the normally-closed contacts of this same relay open and de-energize the quick-start relay 114.

In going from FORWARD to OFF in either wind mode while film remains on the supply reel, mode control switch 108 is actuated such that control power to time delay relay 106 is interrupted and it, in turn, instantly opens the input power circuit to motor control 104 thus stopping the motor. Another section of switch 108 will simultaneously open and de-energize clutch/brake unit 26R thus permitting output shaft 22R, spindle 16R and the take-up reel 14 to free wheel while a drag remains on the supply reel due to the fact that the lefthand clutch/brake unit 26L remains energized in the clutch mode. This permits both reels to coast to a gradual stop without spilling film which would occur if the take-up reel were stopped instantly while the supply reel continued to turn. If, on the other hand, the supply were to be stopped while the take-up reel continued to turn, the film would either break or become scratched as the winds rub against one another.

If one were to start-up in reverse, the righthand reel 14 becomes the supply reel and the lefthand one the take-up reel. With mode selection switch 108 actuated into its REVERSE position, a control voltage is supplied to single-pole double-throw relay 116. This relay functions as an external control switch which, when it closes, actuates time delay relay 118 and delays the closure of its normally-open contacts during a first delay period. When the normally-open contacts of relay 118 close, control power is thus made available simultaneously to relays 97 and 112. When relays 97 and 112 are actuated, they fucntion to switch the power supplies to the clutch/brake units, specifically, connecting variable power supply 94 to the righthand clutch/brake unit 26R and the fixed power supply 92 to the lefthand clutch/brake unit 26L thus energizing the latter into its brake mode.

Another section of switch 108 will simultaneously supply control voltage to time delay 106. As relay 106 times out, it will activate and complete the input power circuit to motor control 104 thereby starting the motor in the same direction it turned during the FORWARD mode. As it does so in the A wind mode, lefthand reel 12 functioning as the take-up reel is being turned clockwise by the clutch/brake unit 26L in its brake mode. Input shaft 24R on the right side will also be turning clockwise; however, its output shaft 22R along with the righthand spindle will be turning counterclockwise as film is being pulled off of it. As shafts 24R and 22R counterrotate, clutch/brake unit 26R in the clutch mode tensions the film to a variable degree depending upon the setting of variable resistor 96 in the variable power supply 94.

It should, perhaps, be pointed out that the time delay period of time delay 118 must be equal to or shorter than the time delay period of time relay 106. The reason for the foregoing is that the clutch/brake units must be energized and operative while the motor is being brought up to speed.

In order to quick-start in REVERSE, quick-start switch 109 is momentarily closed as before and, in addition to its shunting the normally-open contacts of time delay relay 106, it also shunts the normally-open contacts of time delay relay 118 through the fourth section of mode switch 108 and also through another section of relay 114. If the aforementioned normally-open section of mode switch 108 were not present, relays 97 and 113 would be activated at any time the quick-start switch was actuated in both the FORWARD and REVERSE modes, therefore, one could not accomplish a forward wind.

The time delays become primarily useful when shifting directly from FORWARD to REVERSE or vice versa because, obviously, the system must have time to come to a stop before changing direction. Also, as was the case in shifting from the FORWARD mode into the OFF position, clutch/brake unit 26L must be instantly de-energized to allow the lefthand reel 12 to free wheel. This is done in the REVERSE mode somewhat differently. Specifically, when going from REVERSE to either OFF or FORWARD, a section of mode switch 108 interrupts the input to clutch/brake unit 26L allowing the lefthand reel to free wheel while clutch/brake unit 26R on the right side remains energized to apply holdback tension to the supply reel 14 until relays 97 and 112 are deactivated as time relay 118 times out to its normally-open state, whereupon, if the mode switch 108 is in its OFF position, everything will coast to a stop without overrunning and spilling film. Alternatively, if the mode switch 108 is shifted directly from REVERSE to FORWARD, time delay relay 118 begins to time out and relay 106 times in. During these time periods, the system slowly comes to a complete stop, the power supplies 92 and 94 are reconnected, respectively, to clutch/brake units 26R and 26L and the motor M slowly starts up again to its preset speed in the same direction causing the film to wind off of lefthand reel 12 and into righthand reel 14. As the mode switch 108 passes through its OFF position, it momentarily breaks and makes the control voltage to time delay relay 106 thus reinitiating the time delay period.

In going directly from FORWARD to REVERSE, the system functions essentially the same as just described in going from REVERSE to FORWARD except that instead of time delay relay 118 timing out while timed delay relay 106 is timing in, both time in together allowing the system to come slowly to a stop before starting up again in the opposite direction.

As previously noted, shifting the subassembly 52 into its retracted position so as to rotate input shaft 24L in a counterclockwise direction when changing from an A wind situation to a B wind one has no effect on either of the clutch/brake units or the motor, only the power transfer mechanism; therefore, the electronic circuit described above operates the same way in the B drive mode as has been set forth for the A drive mode.

What is claimed is:

1. An apparatus for winding and rewinding film which comprises: first and second film reels mounting spindles mounted for rotation in spaced substantially parallel relation; first and second film reels selectively mountable upon one of said first and second spindles for rotation therewith in side-by-side spaced relation, said reels being aligned to transfer a length of film wound upon one to the other; an electric motor having a motor shaft turning in one directions; first and second input shafts journalled for rotation in coaxial relation to said first and second spindles; a first electrically-actuated electromagnetic combination clutch/brake unit operatively interconnecting said first input shaft to said first spindle; a second electrically-actuated electromagnetic combination clutch/brake unit operatively interconnecting said second input shaft to said second spindle; power transfer means operatively interconnecting said motor shaft and said first and second input shafts for simultaneous synchronous rotation; said first and second clutch/brake units each having a first actuated position effective to frictionally link said input shafts and spindles together for conjoint rotation and said clutch/brake units having a second actuated position effective to frictionally inhibit relative rotational movement between said coaxially-aligned input shafts and spindles in opposite directions, said power transfer means being operative to rotate both of the input shafts in the same direction at the same speed when the film is wound onto the take-up and supply reels in opposite directions; and control means electrically connected to said first and second clutch/brake units operative in a first position to actuate said first clutch/brake unit into its first actuated position and said second clutch/brake unit into its second actuated position whereby the film: reel mounted on said first spindle becomes a driven take-up reel onto which the film is wound and the film reel mounted on said second spindle becomes a frictionally-braked supply reel effective to tension any film wound thereon as it passes to said take-up reel, and said control means having a second operative position effective to shift the first clutch/brake unit into its second actuated position and said second clutch/brake unit into its first actuated position whereby said reel mounted on said second spindle becomes the driven take-up reel and the reel mounted on said first spindle becomes the frictionally-braked supply reel for tensioning the film passing onto the take-up reel.

2. An apparatus for winding said rewinding film which comprises: first and second film reel mounting spindles mounted for rotation in spaced substantially parallel relation; first and second film reels selectively mountable upon one of said first and second spindles for rotation therewith in side-by-side spaced relation, said reels being aligned to transfer a length of film wound upon one to the other; an electric motor having a motor shaft turning in one direction; first and second input shafts journalled for rotation in coaxial relation to said first and second spindles; a first electrically-actuated electromagnetic combination clutch/brake unit operatively interconnecting said first input shaft to said first spindle; a second electrically-actuated electromagnetic combination clutch/brake unit operatively interconnecting said second input shaft to said second spindle; power transfer means operatively interconnecting said motor shaft and said first and second input shafts for simultaneous synchronous rotation; said first and second clutch/brake units each having a first actuated position effective to frictionally link said input shafts and spindles together for conjoint rotation, and said clutch/brake units having a second actuated position effective to frictionally inhibit relative rotational movement between said coaxially-aligned input shafts and spindles in opposite directions, said power transfer means being operative to rotate the input shafts in opposite directions at the same speed when the film is wound in the same direction on both the supply and take-up reels; and control means electrically connected to said first and second clutch/brake units operative in a first position to actuate said first clutch/brake unit into its first actuated position and said second clutch/brake unit into its second actuated position whereby the film reel mounted on said first spindle becomes a driven take-up reel onto which the film is wound and the film reel mounted on said second spindle becomes a frictionally-braked supply reel effective to tension any film wound thereon as its passes to said take-up reel, and said control means having a second operative position effective to shift the first clutch/brake unit into its second actuated position and said second clutch/brake unit into its first actuated position whereby said reel mounted on said second spindle becomes the driven take-up reel and the reel mounted on said first spindle becomes the frictionally-braked supply reel for tensioning the film passing onto the take-up reel.

3. An apparatus for winding and rewinding film which comprises: first and second film reel mounting spindles for rotation in spaced substantially parallel relation; first and second film reels selectively mountable upon one of said first and second spindles for rotation therewith in side-by-side spaced relation, said reels being aligned to transfer a length of film wound upon one to the other; an electric motor having a motor shaft turning in one direction; first and second input shafts journalled for rotation in coaxial relation to said first and second spindles; a first electrically-actuated electromagnetic combination clutch/brake unit operatively interconnecting said first input shaft to said first spindle; a second electrically-actuated electromagnetic combination clutch/brake unit operatively interconnecting said second input shaft to said second spindle; power transfer means operatively interconnecting said motor shaft and said first and second input shafts for simultaneous synchronous rotation; said first and second clutch/brake units each having a first actuated position effective to frictionally link said input shafts and spindles together for conjoint rotation and said clutch/brake units having a second actuated position effective to frictionally inhibit relative rotational movement between said coaxially-aligned input shafts and spindle in opposite directions, said power transfer means including a transmission, said transmission having a first actuated position operative to interconnect the motor shaft and the second input shaft for rotation in the same direction, and said transmission having a second actuated position operative to interconnect said motor shaft and said second input shaft for rotation in opposite directions; and control means electrically connected to said first and second clutch/brake units operative in a first position to actuate said first clutch/brake unit into its first actuated position and said second clutch/brake unit into its second actuated position whereby the film reel mounted on said first spindle becomes a driven take-up reel onto which the film is wound and the film reel mounted on said second spindle becomes a frictionally-braked supply reel effective to tension any film wound thereon as it passes to said take-up reel, and said control means having a second operative position effective to shift the first clutch/brake unit into its second actuated position and said second clutch/brake unit into its first actuated position whereby said reel mounted on said second spindle becomes the driven take-up reel and the reel mounted on the first spindle becomes the frictionally-braked supply reel for tensioning the film passing onto the take-up reel.

4. The film winding and rewinding apparatus as set forth in claim 3 in which: the power transfer means is connected to rotate both of the input shafts in the same direction at the same speed when the film is wound onto the take-up and supply reels in opposite directions.

5. The film winding and rewinding apparatus as set forth in claim 3 in which: the power transfer means is connected to rotate the input shafts in opposite directions at the same speed when the film is wound in the same direction on both the supply and take-up reels.

6. The film winding and rewinding apparatus as set forth in claim 3 in which: the control means includes rheostat means for varying the frictional forces acting to retard rotation of the supply reel, said means being operative upon actuation to vary the current supplied to the clutch/brake unit actuated into its second position, said clutch/brake unit when thus actuated becoming effective to vary the tension on the film.

7. The film winding and rewinding apparatus as set forth in claim 3 in which: the control means includes a normally-closed switch means electrically connected to the motor and operative upon actuation into open position to cut off power to the latter; a third shaft mounting an idler roller for rotation is positioned between the spindles in supporting relation to a tensioned section of film passing between the reels for movement relative thereto between a retracted position and an extended position operative to engage said normally-closed switch means and actuate same in open position; means connected to said third shaft normally biasing it into extended position, said third shaft and biasing means cooperating with one another and with a tensioned section of film passing between the reels and over the idler to hold said third shaft in retracted position overcoming the bias exerted thereon by said biasing means thus leaving the normally-closed switch closed, said biasing means being further operative when a film end leaves the supply reel and the film is no longer under tension to release said third shaft into its extended position thereby shutting off the motor; and, in which the motor includes an armature connected to its motor shaft for conjoint rotation, said armature cooperating with the motor shaft and the power transfer means connecting the latter to the spindle mounting the take-up reel to provide an inertia brake effective to slow down and stop said take-up reel upon actuation of said normally-closed switch means into open position thereby cutting off electrical power to the motor.

8. The film winding and rewinding apparatus as set forth in claim 3 in which: the control means includes a fixed power supply, a variable power supply and a three position switch selectively connectable into circuits including the motor and the clutch/brake units, said three position switch having a first position operatively interconnecting said variable power supply and second clutch/brake unit in a circuit while leaving the first clutch/brake unit de-energized, said three position switch having a second position operatively interconnecting said variable power supply in a circuit with said second clutch/brake unit and said fixed power supply in a circuit with said first clutch/brake unit, and said three position switch having a third position operatively interconnecting said variable power supply in a circuit with said first clutch/brake unit and said fixed power supply in a circuit with said second clutch/brake unit.

9. The film winding and rewinding apparatus as set forth in claim 7 in which: the control means includes normally-open switch means operative upon actuation into closed position to shunt the normally-closed switch means when the latter is open thus enabling the motor to be started.

10. The film winding and rewinding apparatus as set forth in claim 8 in which: the control means includes first time delay means responsive to actuation of the three position switch means between its second and third positions operative to de-energize the motor for a period selected to delay start-up thereof so as to drive the reels in the opposite direction until they come to a stop.

11. The film winding and rewinding apparatus as set forth in claim 8 in which: the three position switch means is operative when actuated from either its second or third positions into its first position to disconnect the fixed power supply from the clutch/brake unit powered thereby thus permitting the reel operatively connected to the latter to free wheel and coast to a stop, and said three position switch being simultaneously operative to shut off power to the motor while maintaining the other of said clutch/brake units energized to supply holdback tension to the film on the other of said reels.

12. The film winding and rewinding apparatus as set forth in claim 8 in which: the control circuit includes means responsive to actuation of the three position switch in either its second or third positions operative to bring the motor up to speed slowly over a predetermined time interval.

13. The film winding and rewinding apparatus as set forth in claim 10 in which: the control means includes shunt means operative upon actuation to bypass the first time delay means when the three position switch means is actuated into either its second or third positions from its first position.

14. The film winding and rewinding apparatus as set forth in claim 10 in which: the control means includes a second time delay means cooperating with the first time delay means upon actuation of the three position switch means from its first position into either of its second or third positions to delay energization of the clutch/brake units for a time interval equal to or less than that during which the start up of the motor is delayed by said first time delay means.

* * * * *